United States Patent
Palmer et al.

(10) Patent No.: US 6,855,926 B2
(45) Date of Patent: Feb. 15, 2005

(54) INSTRUMENT AND METHOD FOR COMBINED SURFACE TOPOGRAPHY AND SPECTROSCOPIC ANALYSIS

(75) Inventors: Richard Edward Palmer, West Midlands (GB); Krister Svensson, Gotheburg (GB); Peter Georg Laitenberger, Cambridge (GB); Frederic Festy, London (GB); Brian John Eves, Birmingham (GB)

(73) Assignee: The University of Birmingham (GB)

( * ) Notice: Subject to any disclaimer, the term of this patent is extended or adjusted under 35 U.S.C. 154(b) by 0 days.

(21) Appl. No.: 10/182,168

(22) PCT Filed: Jan. 31, 2001

(86) PCT No.: PCT/GB01/00377

§ 371 (c)(1),
(2), (4) Date: Jul. 25, 2002

(87) PCT Pub. No.: WO01/57878

PCT Pub. Date: Aug. 9, 2001

(65) Prior Publication Data

US 2003/0010911 A1 Jan. 16, 2003

(30) Foreign Application Priority Data

Feb. 3, 2000 (GB) ............................................. 0002367

(51) Int. Cl.[7] .......................... H01J 47/00; G01N 23/00; G21K 7/00
(52) U.S. Cl. ........................ 250/305; 250/306; 250/307; 250/310; 250/311; 250/396 R; 250/397; 250/398; 250/399; 250/400; 250/492.3
(58) Field of Search ................................ 250/305–307, 250/310–311, 397–400, 492.3, 396 R; 315/381

(56) References Cited

U.S. PATENT DOCUMENTS

| | | | | |
|---|---|---|---|---|
| 3,938,001 A | * | 2/1976 | Ota et al. | 315/381 |
| 5,585,629 A | * | 12/1996 | Doran et al. | 250/310 |
| 2003/0010911 A1 | * | 1/2003 | Palmer et al. | 250/306 |

FOREIGN PATENT DOCUMENTS

EP 0189498 A1 * 8/1986 .......... H01J/37/256

OTHER PUBLICATIONS

Tomitori et al., "Energy spectrum of backscattered electrons excited by a field emission scanning tunneling microscope with a build-up [111]-oriented W tip", Applied Surface Science 144–145 (1999) 123–127.*

(List continued on next page.)

*Primary Examiner*—John R. Lee
*Assistant Examiner*—Bernard E. Souw
(74) *Attorney, Agent, or Firm*—Andrus, Sceales, Starke & Sawall, LLP

(57) ABSTRACT

A combined surface topography and spectroscopic analysis instrument comprises a scanning tunnelling microscope tip (12); and a sample carrier (58) which supports a sample (10) so that a surface thereto to be analyzed is presented towards the tip (12). The sample carrier (58) and the tip (12) are relative movable to enable the distance between the tip (12) and the surface to be varied in use and the sample surface to be scanned in two dimensions by the tip (12). An electronic analyzer is positioned to detect electrons from the tip (12) which have been back-scattered off the sample surface. A voltage controller (59) enables selective operation of the tip (12) in a first voltage range in scanning tunnelling mode, to enable spatial resolution imaging of the sample surface, and in a second, higher, voltage range in electron field emission mode whereby to permit the electron analyzer to analyze the back-scattered electrons. The electron analyzer is positioned so as to detect back-scattered electrons travelling at an angle of less than 20° with respect to the sample surface.

17 Claims, 10 Drawing Sheets

OTHER PUBLICATIONS

Figure 4:
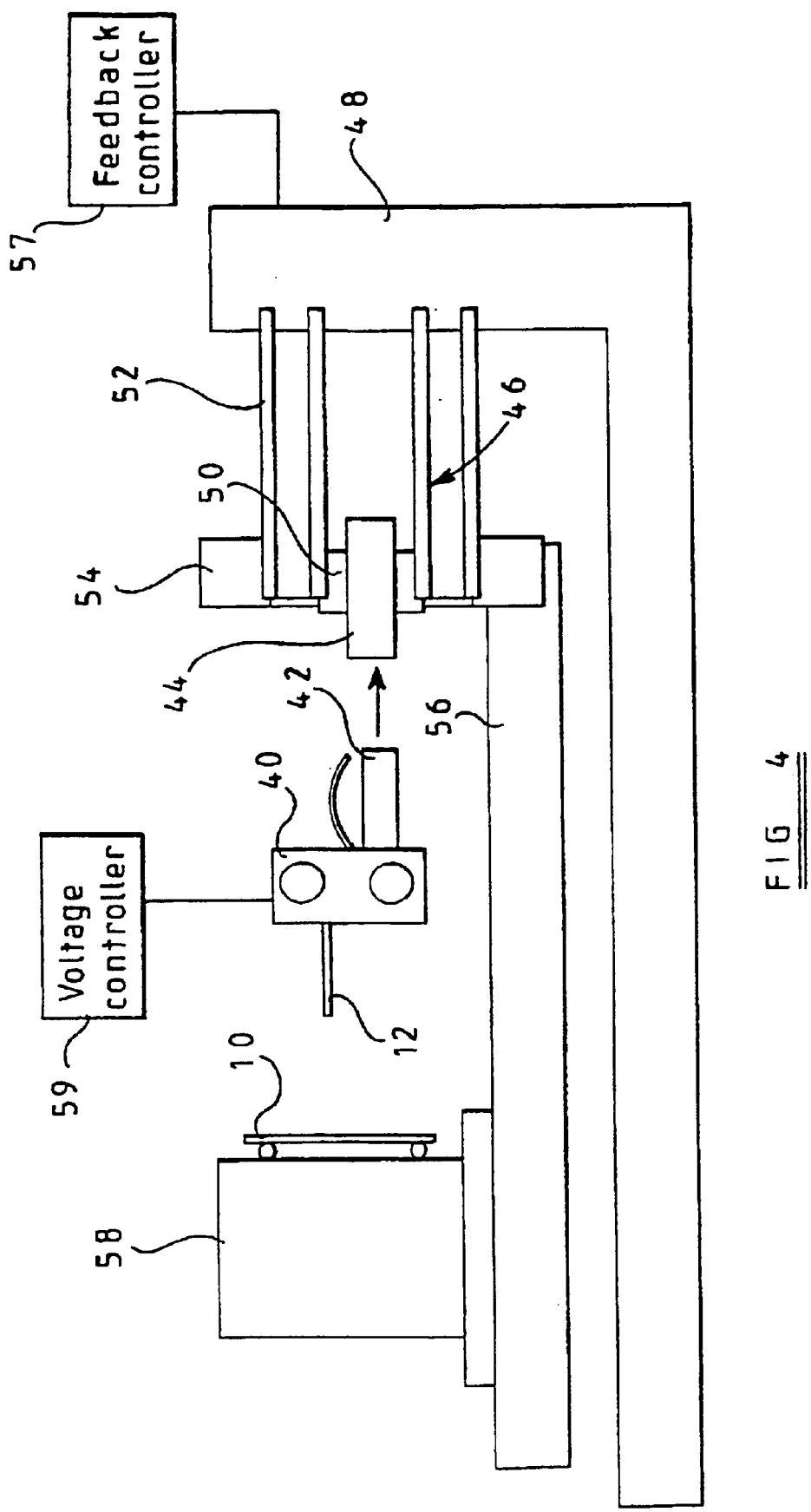

Wilms et al., "New and versatile unltrahigh–vacuum scanning tunneling microscope for film growth experiments", Review of Scientific Instruments 69 (7), 1998, 2696–2702.*

Browning et al., "A digital scanning Auger electron microscope incorporating a concentric hemispherical analyser", Proc. R. Soc. Lond. A 357 (1977) pp.213–230.*

Lyding et al., "Variable–temperature scanning tunneling microscope", Rev. Sci. instrum., 59 (9), 1988, 1897–1902.*

Allenspach et al., "Spin–polarized secondary electrons from a scanning tunneling microscope in field emission mode", Appl. Phys. Lett. 54 (6), 1989, 587–589.*

Fink, H.–W., "Point Source for Ions and Electrons", Physica Scripta 38, 1988, 260–263.*

IBM Research, "Auger Electron Spectroscopy", Aug. 15, 2000, http://www.almaden.ibm.com/st/projects/materialsanalysis/auger/.*

Eves et al., "Scanning probe energy loss spectroscopy: Angular resolved measurements on silicon and graphite surfaces", Appl. Phys. Lett. vol. 77 No. 25, 2000 pp.4223–4225.*

* cited by examiner

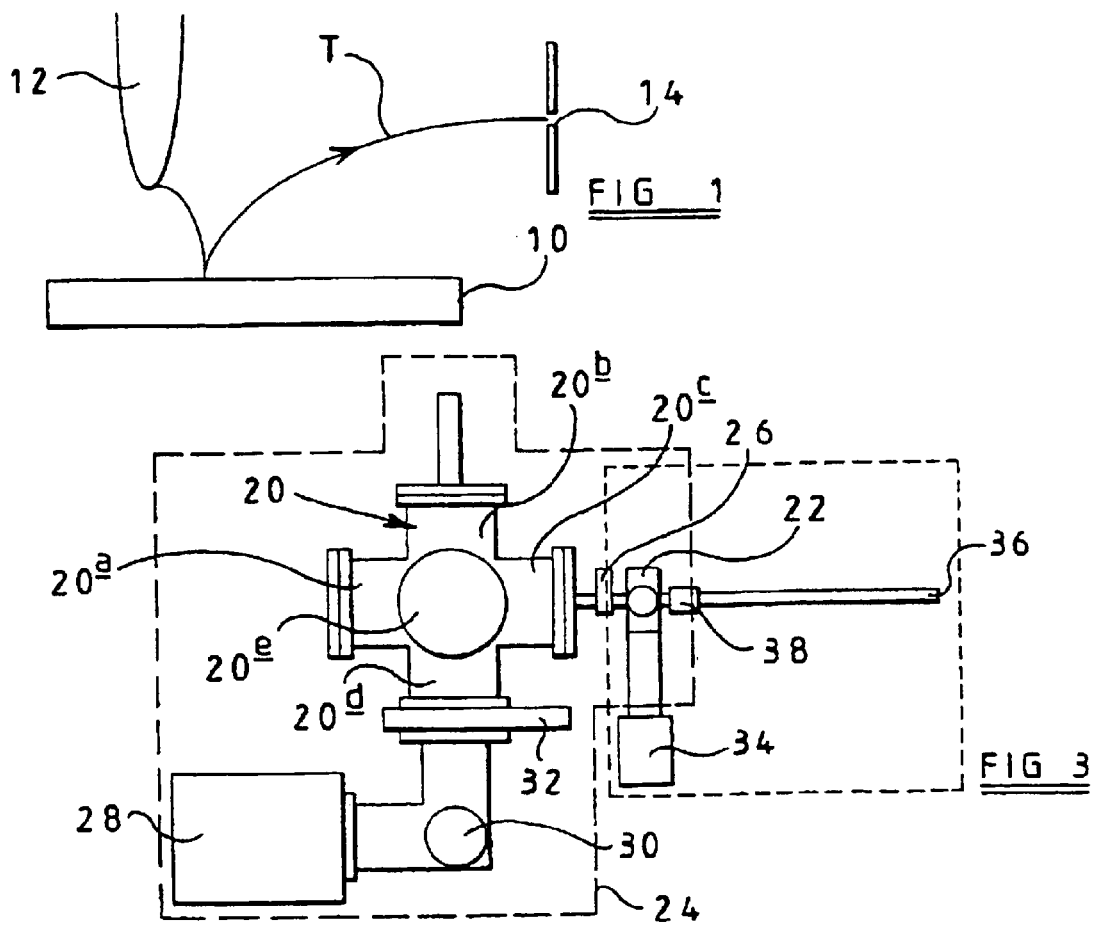
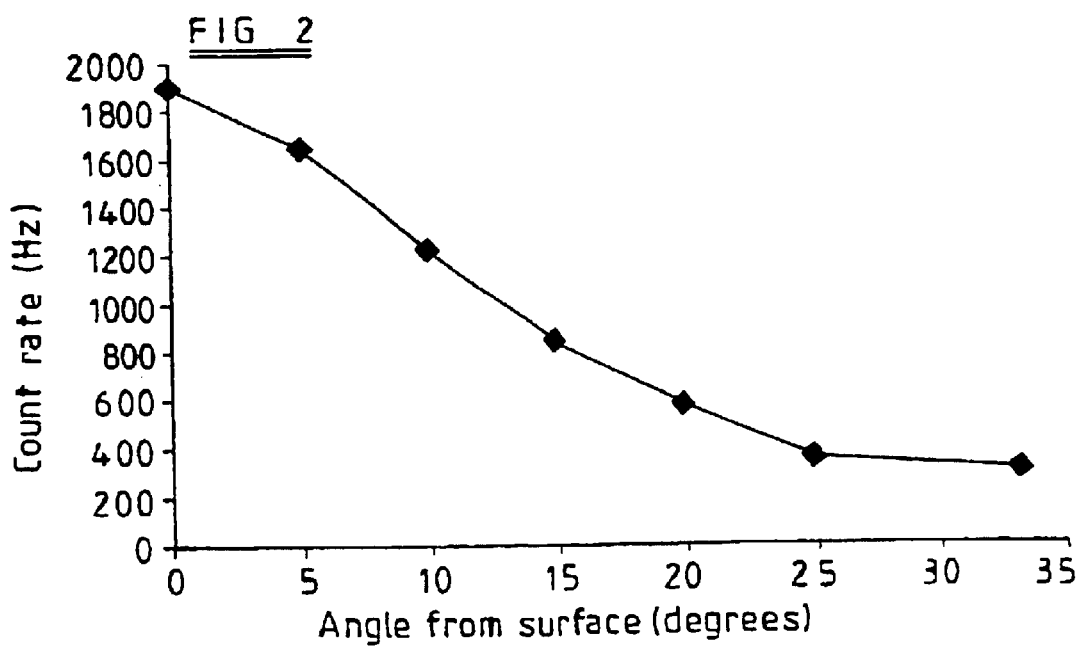

SPELS spectrum obtained on a gold surface with an incident beam of energy of 182 eV.

SPELS spectrum obtained on Si(111) with an incident beam energy of 100 Ev. The elastic peak, the surface plasmon and bulk plasmon of the silicon, and the bulk plasmon of SiC are seen at energies of 0, 12.0, 17.5 and 20.8 eV respectivly SPELS spectrum obtained on highly orientated pyrolytic graphite (HOPG) at incident beam energy of 120 eV. The loss at 7.4 eV corresponds to the graphite surface plasmon peak.

INSTRUMENT AND METHOD FOR COMBINED SURFACE TOPOGRAPHY AND SPECTROSCOPIC ANALYSIS

This invention relates to a spectrometer, to a method of spectroscopic analysis, and to a method of spectroscopic and surface topographic analysis.

Nearly 30 years ago, which was before the invention of the STM (scanning tunnelling microscope), it was proposed by R. D. Young et al (Phys. Today, 24, 42 (1971) to image the surface of a sample by controlling the distance between the surface and an electron emitting probe tip using a feedback loop to keep the field emission current constant whilst moving the tip over the surface. The variation in voltage in maintaining a constant tip-to-surface distance was used to obtain a measure of the surface topography. Young et al also suggested that chemical information on the species at the surface could be obtained from analysis of the energy of the back-scattered electrons (i.e. electrons emitted from the tip which have been reflected from the surface). They demonstrated that images of secondary electrons (i.e. electrons which have been caused to be emitted from the surface as a result of impingement of the electron beam from the tip) could be obtained in the same way as the SEM (scanning electron microscope) images surfaces. However, because the field emission current is not particularly sensitive to the tip-to-surface separation, this technique of measuring surface topography is less sensitive than the subsequently developed and widely accepted STM which exploits the exponential current dependence in the tunnelling regime.

H-W. Fink et al (Physica Script, 38, 260 (1988)) used a STM in field emission mode with a design of emitter tip which enabled a signal of secondary electrons to be detected at low tip voltages, but the electron detection system employed did not permit energy analysis, and therefore was incapable of obtaining any spectroscopic data.

B. Reihl et al (Surf. Sci., 189/190, 36, (1987)) and European Patent Application No. 85100892.0 disclosed a combined instrument consisting of an STM and an electron energy analyser. A tungsten tip was mounted on two bending piezoelectric elements cut in half and biased with voltages of opposite sign, allowing for scanning of the sample being analysed in only one dimension. A voltage of 1000V was applied to the STM tip which was positioned several hundred micrometers from the surface being scanned to avoid strong electric fields on the surface and the tip. They measured a one-dimensional STM topograph on a gold sample, and the energy of Auger electrons and back-scattered electrons were measured to obtain spectroscopic data, although no scanning was carried out in field emission mode the spatial resolution was predicted to be relatively low (about one micrometer).

M. Tomitori et al (Applied Surface Science, 144–145 (1999) 123–127) disclosed a field emission STM using an atomically sharpened tungsten tip operated at high voltages of the order of 1.6 keV, with the tip being disposed at several tens of micrometers from the surface of the sample being analysed. No images or chemical map were published to indicate the resolution of the instrument. Also, Tomitori et al identified anomalous large peaks in the spectrum possibly associated with inelastic scattering by the tip holder assembly.

It is an object of the present invention to provide a particularly convenient spectrometer which can be of relatively small size and which can be used for the non-destructive analysis of samples, thus making it particularly suitable for the spectroscopic analysis of, for example, organic samples such as biological samples.

According to a first aspect of the present invention, there is provided a spectrometer comprising:
(i) an electron emitter tip;
(ii) a sample carrier adapted to carry a sample so that a surface thereof to be analysed is presented towards the tip;
(iii) means for effecting relative movement between the carrier and the tip so as to enable the distance between the tip and the surface to be varied in use and so as to enable the sample surface to be scanned in two dimensions by the tip; and
(iv) an electron analyser positioned to analyse electrons emitted from the tip and which have been back-scattered off the sample surface in use whereby to perform spectroscopic analysis of the sample; wherein:
the electron analyser is positioned so as to detect back-scattered electrons travelling at an angle of less than 20° (and preferably not more than 15°) with respect to the sample surface.

Also according to said first aspect of the present invention, there is provided a method of spectroscopically analysing the surface of a sample, comprising the steps of:
(i) effecting relative movement between an electron emitter tip and the surface of the sample so as to scan the surface in two dimensions;
(ii) causing electrons emitted from the tip to impinge against the surface and be back-scattered thereby; and
(iv) analysing the back-scattered electrons;
wherein the back-scattered electrons which are travelling at an angle of less than 20° (and preferably not more than 15°) with respect to the sample surface are analysed.

The spectrometer of the first aspect of the present invention can be made very compact because it is designed to be operated at relatively low beam energies with smaller tip-to-sample distances than have previously been reported for spectroscopic analysis. Additionally, it is particularly surprising that a maximum signal can be obtained by analysis of back-scattered electrons travelling at such grazing angles to the plane of the surface being analysed (see FIG. 2 referred to hereinafter). It would be expected that no detectable signal could be obtained using smaller than previously reported tip-to-surface distances as the intense electric field would force back-scattered electrons against the sample, thus making reliable analysis impossible.

The electron beam energy in the spectrometer and method according to said first aspect of the present invention may be between about 10 and 200 eV.

The tip-to-sample distance in the spectrometer and method according to said first aspect of the present invention is typically less than 200 nm, e.g. between 10 and 100 nm.

To obtain maximum possible resolution, the tip is as sharp as possible and the tip-to-sample distance is as small as possible. For example, with a tip radius of 10 nm, a spatial resolution of 5 nm is possible at a tip-to-sample distance of 100 nm. Generally, a resolution of better than 50 nm can be achieved. The tip radius preferably does not exceed 30 nm, otherwise it is difficult to detect signals from the back-scattered electrons.

Preferably, means are provided for adjusting the angle of the analyser with respect to the surface being analysed.

According to a second aspect of the present invention, there is provided a combined surface topography and spectroscopic analysis instrument comprising:
(i) a scanning tunnelling microscope tip;
(ii) a sample carrier adapted to carry a sample so that a surface thereof to be analysed is presented towards the tip;
(iii) means for effecting relative movement between the carrier and the tip so as to enable the distance between the tip and the surface to be varied in use and so as to enable the sample surface to be scanned in two dimensions by the tip; and (iv) an electron analyser positioned to detect electrons from the tip which have been back-scattered off the sample surface in use; wherein:

first control means are provided for selectively operating the tip in a first voltage range (e.g. −5 V to +5V) in scanning tunnelling mode, to enable spatial resolution imaging of the sample surface, and second control means are provided for selectively operating tip in a second voltage range higher than the first, so that the tip is operated in electron field emission mode whereby to permit the electron analyser to analyse the back-scattered electrons.

Also according to a second aspect of the present invention, there is provided a method of effecting combined surface topographic and spectroscopic analysis of a surface of a sample comprising the steps of:

(i) effecting relative movement between the surface and a scanning tunnelling microscope tip;

(ii) selectively operating the tip in a first voltage range, in scanning tunnelling mode, to enable spatial resolution imaging of the sample surface;

(iii) selectively operating tip in a second voltage range higher than the first voltage range, so that the tip is operated in electron field emission mode; and (iv) analysing back-scattered electrons so as perform spectroscopic analysis of the sample surface when the tip is operated in field emission mode.

Thus, when an electron analyser of the electron energy loss detector type (e.g. a retarding field analyser or a hemispherical analyser) is used, the instrument and method according to the second aspect of the present invention enable not only high spatial resolution imaging of the sample surface but also accurate chemical mapping of atomic and molecular species on the surface by electron energy loss spectroscopic analysis with the sample in situ by the use of different voltages applied to the scanning tunnelling microscope tip. Alternatively, instead of using an electron analyser of the electron energy loss detection type, it is possible to use an electron spin analyser to image magnetisation direction with a spatial resolution of nanometers. This can be used for mapping magnetic domains in the surfaces of magnetic media. This type of electron spin analyser can also be used in the spectrometer and method according to said first aspect of the present invention. (R. Allenspach and A. Bischof, Appl. Phys. Lett 54 (6), (1989))

The instrument and method of the second aspect of the present invention preferably respectively incorporate the features of the spectrometer and the method according to said first aspect of the present invention. Surface analysis can be carried out with nanometer resolution, with electron energy loss spectra or electron spin data involving electron excitations from as low as a few tenths to several tens of electron volts.

The whole instrument can be manufactured to bench top size.

The instrument can be used first to image the surface at low voltage, in regular STM mode, and then the tip can be positioned over a feature of interest and used at higher voltage to obtain spectroscopic data as mentioned above.

In a typical example, with a tip voltage of 130 eV, a sample current of 20 nA, the back-scattered (reflected electrons) are mainly located in a lobe (Full Width at Half Maximum angular distribution=about 13°) which is substantially parallel to the sample surface (a Si(111) plane).

In another mode of operation, the instrument is used in field-emission imaging mode where the electron beam scans the surface while the signal on the analyser is recorded as a function of the lateral position. These images can then be used to produce a chemical map of the surface.

The tip can be prepared in a manner per se known by heating a polycrystalline tungsten wire in a vacuum to remove all impurities, followed by electrochemical etching and further heat treatment in a vacuum to remove any coating layers formed in the etching process.

However, the tip is preferably made from tungsten which preferably has a [111] orientation. Accordingly, it is particularly preferred to etch a filament of a [111]-orientated tungsten single crystal, followed by thermal-field treatment by applying a high voltage to the tip whilst heating it in vacuum. (Fink, Physica Scripta. Vol 38, 260–263, (1988)).

An alternative method of fabrication is to form silicon tips by way of reactive ion etching with or without thermal oxidation sharpening, tungsten coating and dielectric layer coating by plasma-enhanced chemical vapour deposition, metal layer coating by evaporation, and gate aperture opening by wet chemical etching to produce a gated tungsten field emission tip. (L. Chen and M. M. El-Gomati, J. Vac. Sci. Technol. B 17(2), (1999)).

The tip may be shielded with a coaxial cylindrical sheath which is grounded and which typically terminates about 200 nm from the apex of the tip. This reduces the inhomogeneous field created by the tip in use, and allows electrons to escape with a single bounce.

As another example of the use of such a cylindrical sheath, a grounded enclosure with an aperture towards the surface may be provided around the tip so as to project forwardly of the tip towards the location at which the sample surface is disposed in use. This enclosure can serve to provide a field free zone between the surface and the enclosure.

Lensing may be provided in the enclosure for focussing the electron beam between the tip and the surface. Also, an energy dispersive electron optical system may be provided for monochromation of the electrons such that the energy width of the electrons is tens of millielectron volts or less which can be used to investigate vibrational states of molecules adsorbed on the sample surface.

An embodiment of the present invention will now be described, by way of example, with reference to the accompanying drawings, in which:

FIG. 1 is a schematic illustration showing the basic principles underlying the first aspect of the present invention, FIG. 2 is a graph in which the back-scattered electron count rate is plotted against angle from the surface.

Figure 5:
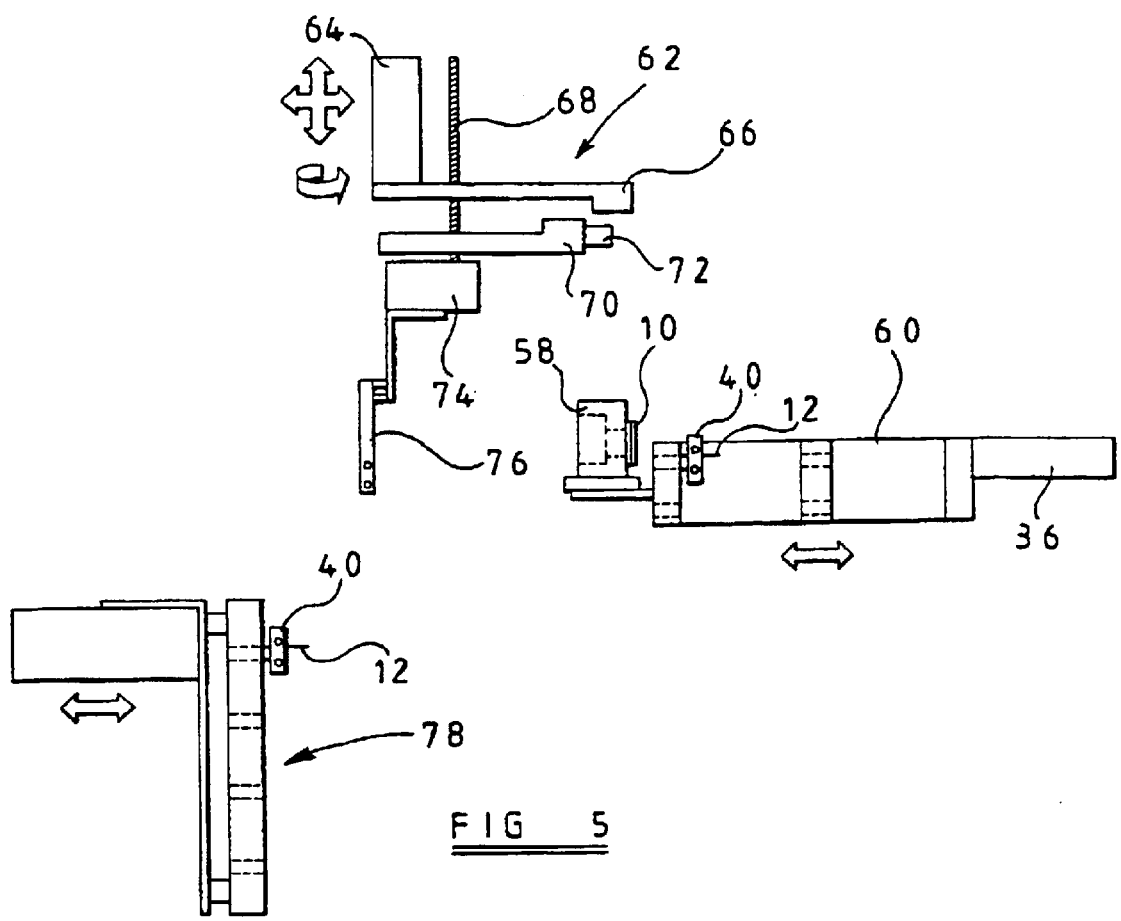
Figure 6:
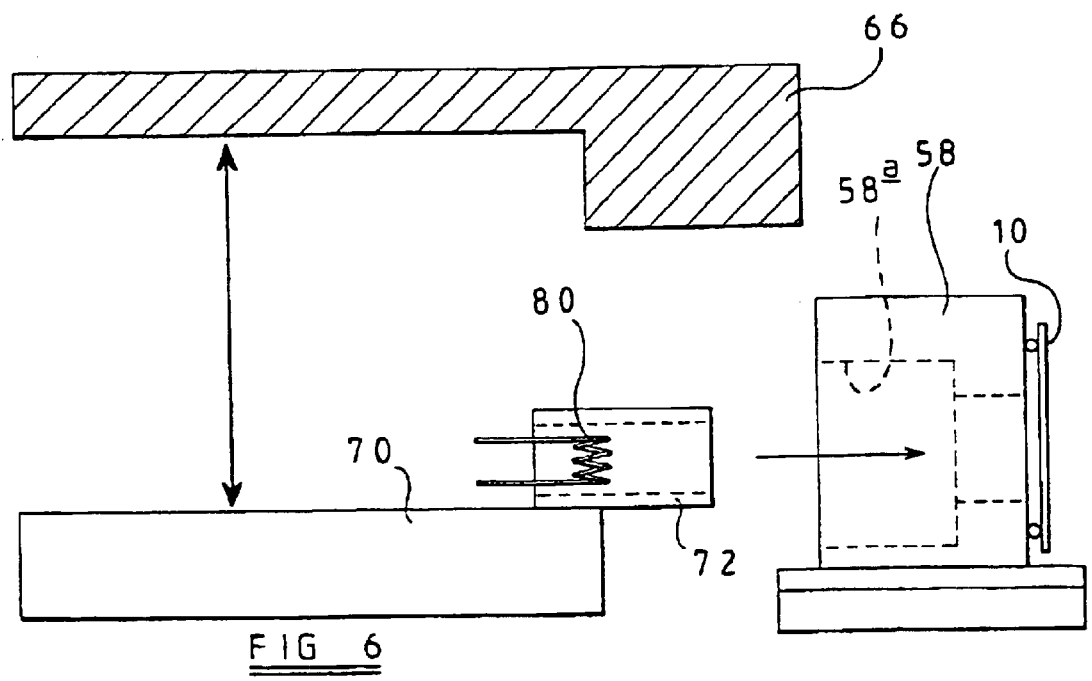
Figure 7:
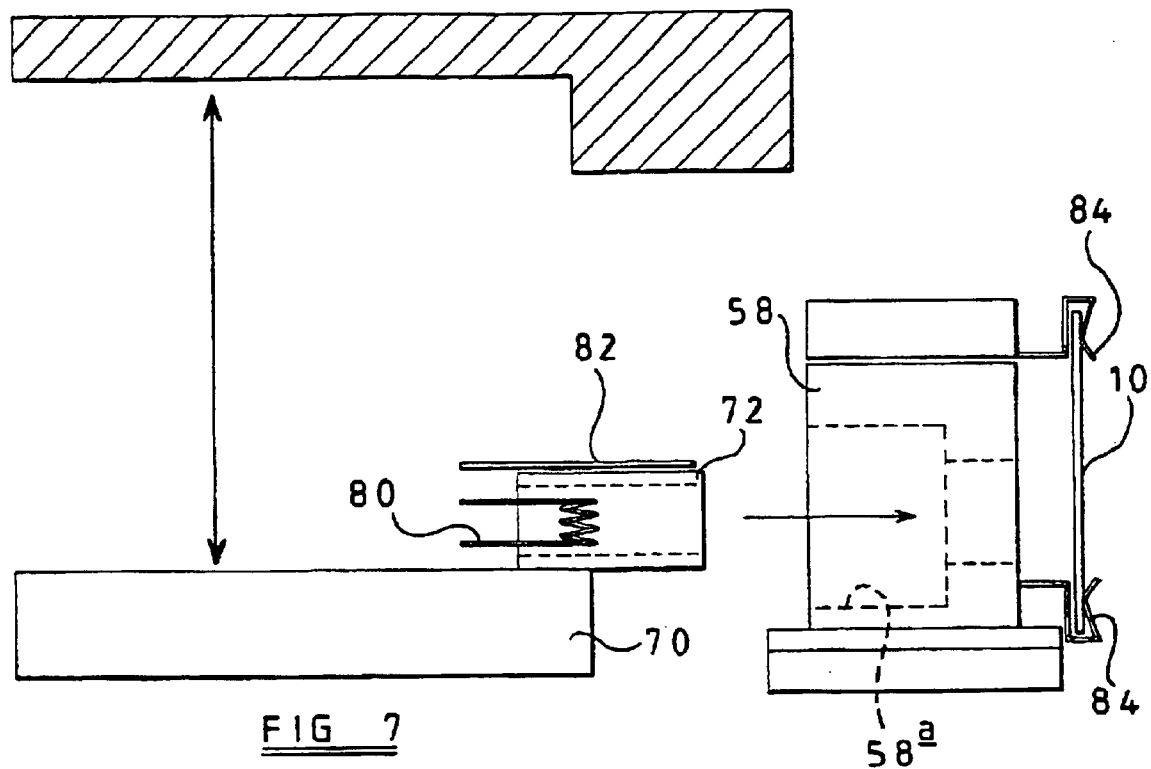
Figure 8:
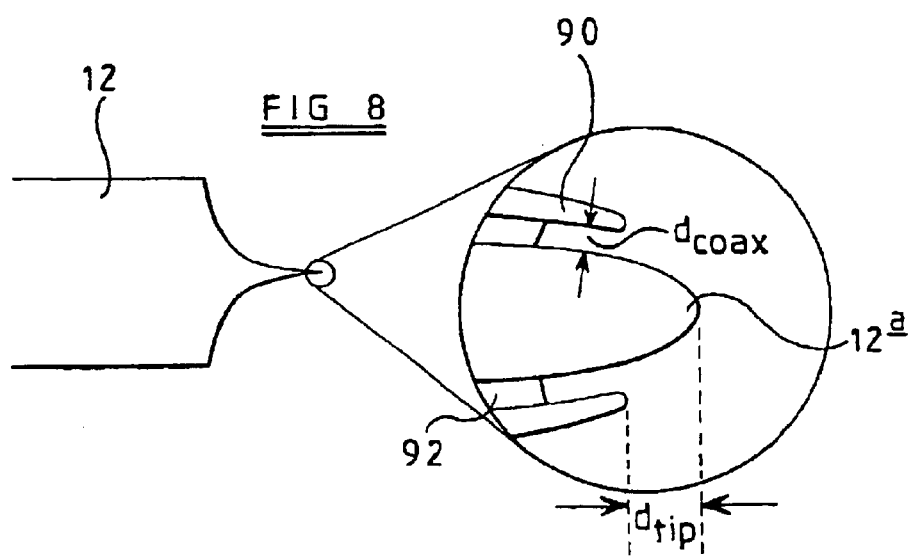
Figure 9:
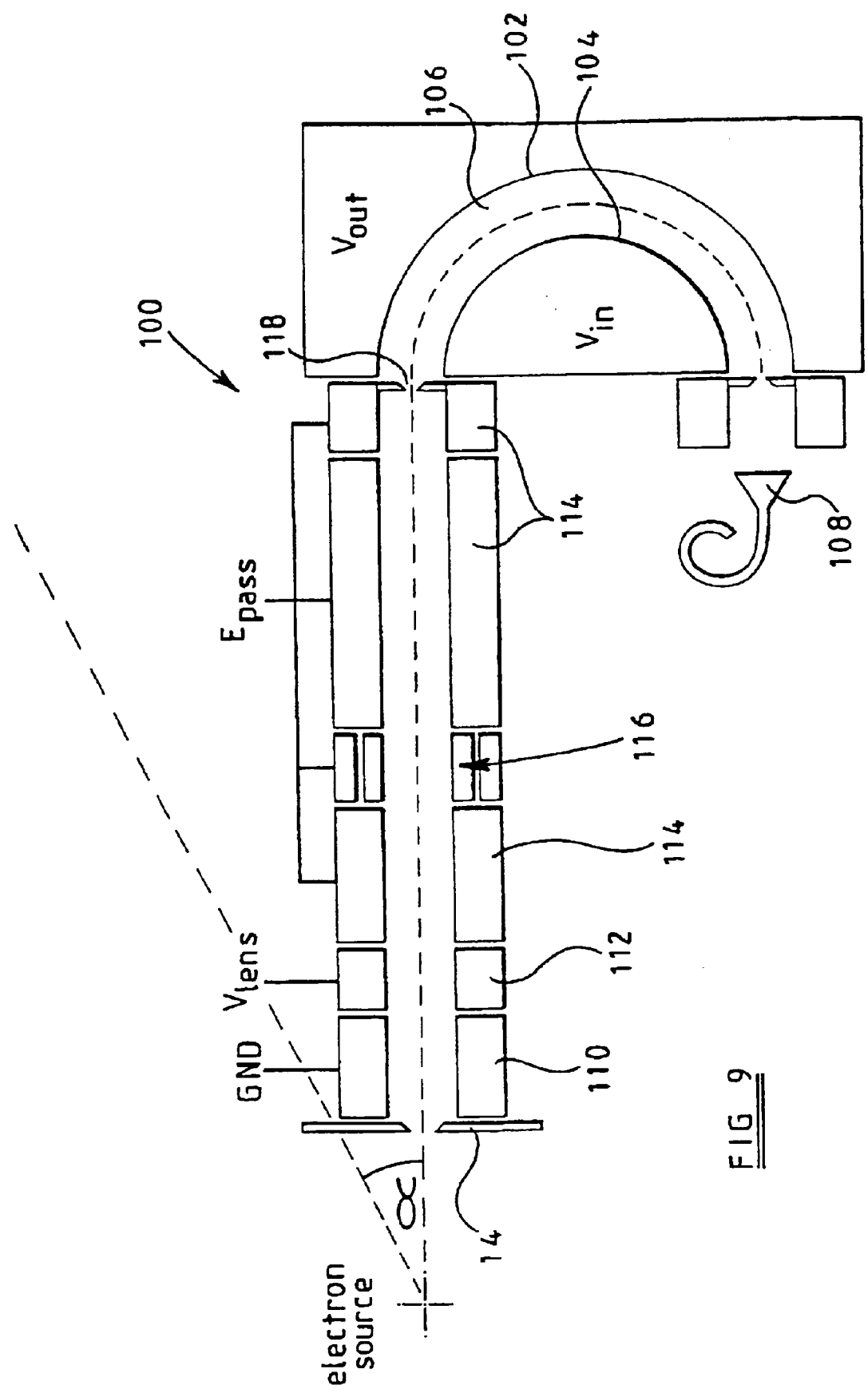
Figure 11:
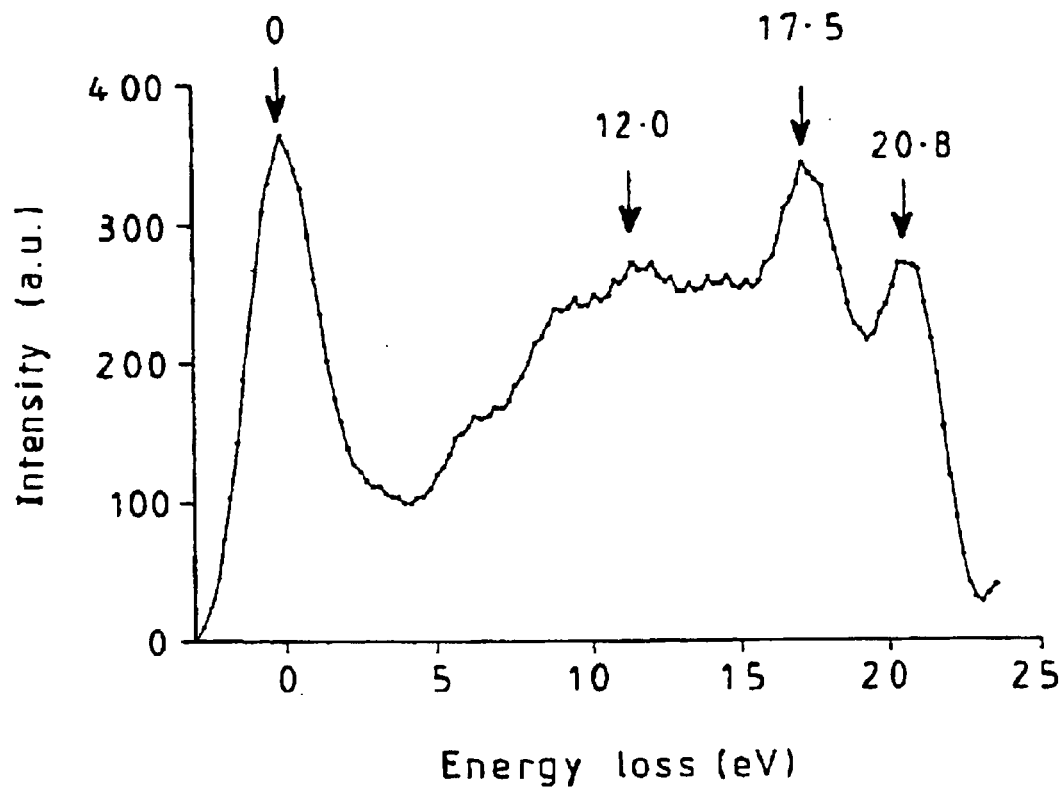
Figure 12:
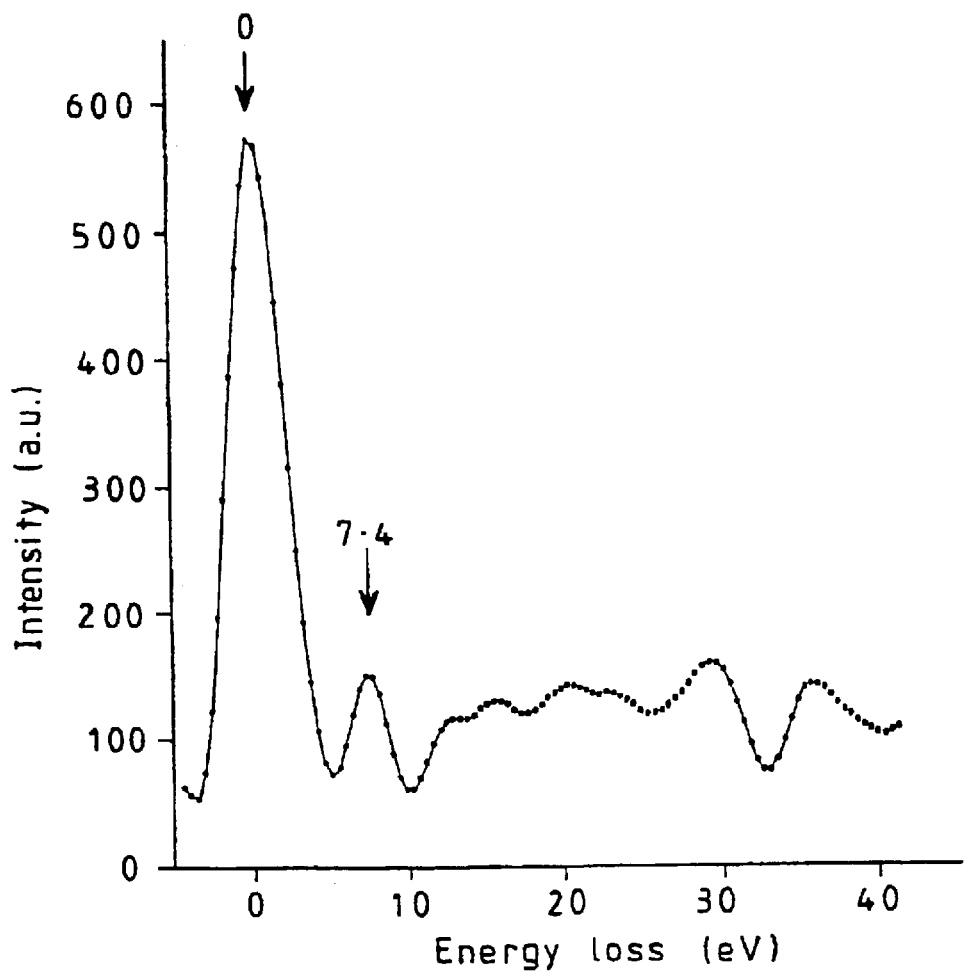
Figure 13:
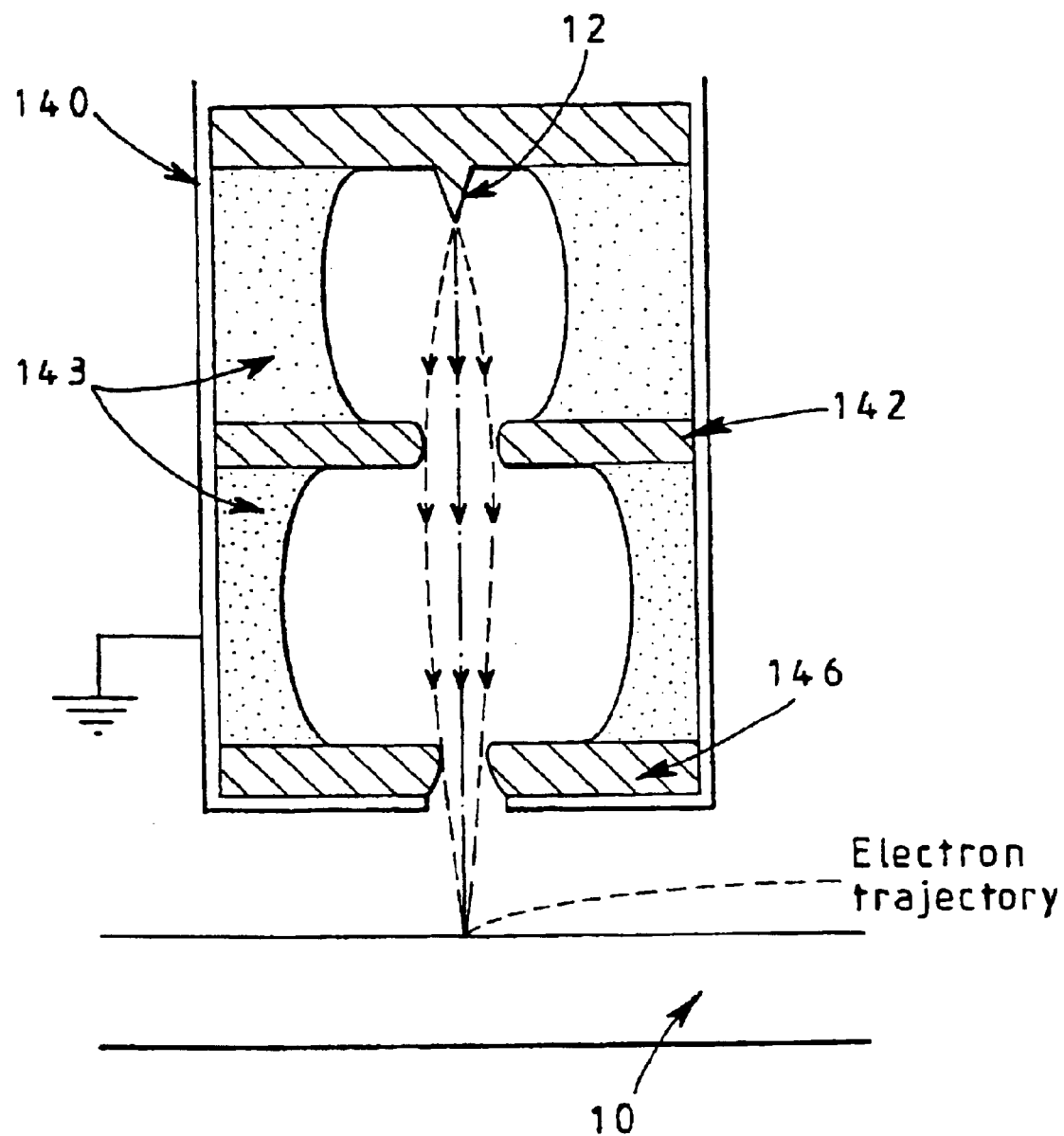
Figure 14:
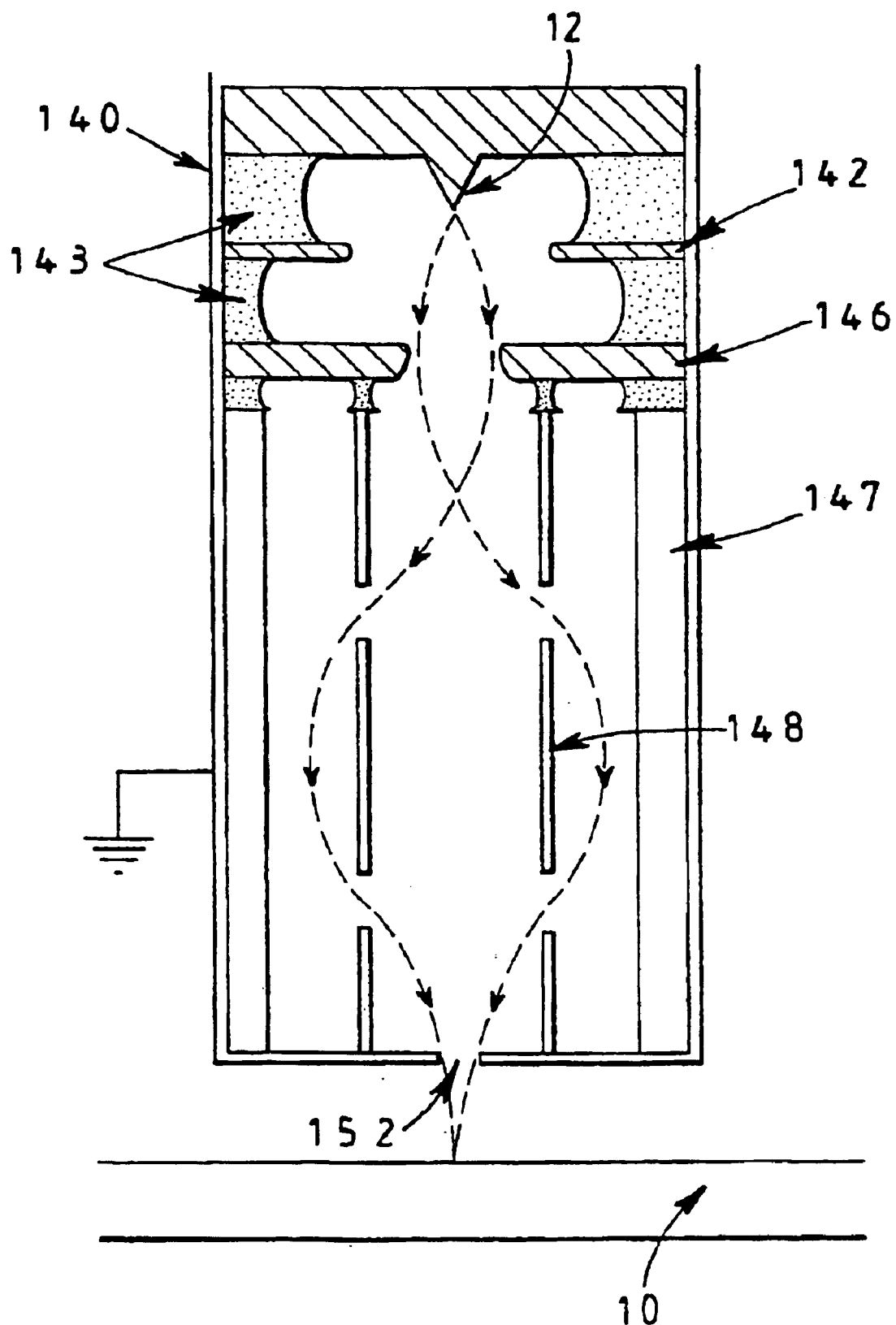

FIG. 3 is a schematic general arrangement of an embodiment of an instrument according to the present invention, FIG. 4 is a schematic illustration of a scanning tunnelling microscope forming part of the instrument of FIG. 3, FIG. 5 is a schematic illustration of a transfer system forming part of the instrument of FIG. 3, FIG. 6 is a schematic illustration of an electron bombardment heating system for cleaning a sample being analysed, FIG. 7 is a schematic illustration of an alternative form of heating system for cleaning the sample, FIG. 8 is a detail view showing the construction of a coaxial STM tip, FIG. 9 is a schematic illustration of an electron analyser forming part of the instrument of FIG. 3, FIGS. 10 to 12 show spectra obtained on various samples using an instrument according to the present invention FIG. 13 is a schematic illustration of an alternative tip arrangement, and FIG. 14 is a schematic illustration of another tip arrangement Referring now to FIG. 1 of the drawings, there is shown a sample 10 to be analysed which can, for example, be formed of silicon. An STM tip 12 is positioned in close proximity (less than 200 nm) to the surface of the sample 10 being analysed. The STM tip 12 is sharp and has a tip radius of less than 30 nm, for example 10 nm.

FIG. 1 shows the tip 12 being operated in field emission mode at a voltage which is typically about 130 eV with a current flow within the sample 10 of typically 20 nA. Electrons emitted from the tip 12 impinge against the surface of the sample 10 and are back-scattered so as to follow the illustrated curved trajectory T. Back-scattering of the electrons takes place in a direction away from the tip 12 towards an entrance aperture 14 of an electron analyser 100 (not shown in FIG. 1) to be described hereinafter. The entrance aperture 14 is located about 40 mm from the tip 12 so as to receive back-scattered electrons which are travelling more or less parallel to the surface of the sample 10. However, the electron analyser can be pivoted through an arc so as to enable electrons travelling at an angle of up to 26° with respect to the surface of the sample 10 to travel through the aperture 14. The angle can be adjusted to give the best results, but with the operating parameters envisaged, it is considered that angles of less than about 15° will be the most appropriate. This is confirmed by reference to FIG. 2, which shows that the back-scattered electron count rate is at a maximum at grazing angles relative to the plane of the surface of the sample.

Within the electron analyser, the electron energy loss can be detected, thereby to give an indication of the chemical nature of the point on the surface of the sample 10 against which the electrons have impinged.

Referring now to FIG. 3 of the drawings, a vacuum system housing the instrument comprises a main chamber 20 and a load-lock chamber 22 surrounded by a baking shield 24 which is provided so that the main chamber 20 can be heated to remove water vapour to enable an ultra high vacuum to be obtained. The main chamber 20 has a region 20a containing the scanning tunnelling microscope, a region 20b in which a manipulator mechanism is provided, a region 20c communicating with the load-lock chamber 22 via a gate valve 26, and a region 20d containing an ion gauge and communicating with an ion pump 28 and a titanium sublimation pump 30, via a further gate valve 32.

The main chamber 20 further includes a region 20e containing the electron analyser and a further region which lies at the back of the main chamber 20 and which is therefore not illustrated FIG. 3. Such further region has a window therein to enable viewing of the various internal parts of the main chamber 20.

The load-lock chamber 22 is connected to a turbomolecular pump 34 to maintain a low pressure in the chamber 22, and is equipped with a cold cathode gauge and also with a transfer arm 36 to enable samples and STM tips to be loaded into the main chamber 20. The transfer arm 36 includes a flexible coupling 38 to facilitate handling of the parts to be manipulated within the instrument, as will be described later.

Referring now to FIG. 4, the scanning tunnelling microscope (STM) part of the instrument will now be described. The STM is a modified form of an STM design of J. W. Lyding (J. W. Lyding et al, Rev. Sci. Instr. 59, 1897 (1988)). The STM tip 12 is mounted in a carrier 40 furnished with a spigot 42 which is friction fit within an aperture in a tip holder 44. An inner scanning piezo-electric tube 46 is supported at one end on a suspended copper support 48 and carries the tip holder 44 via an insulating collar 50. The copper support 48 also carries an outer piezo-electric tube 52 which is concentric with the tube 46. At the opposite end of the tube 52 to the support 48, an outer insulating collar 54 is provided which is spaced outwardly of the collar 50. The outer insulating collar 54 carries a pair of graphite- or silver-coated quartz rods 56 upon which a molybdenum sample holder 58 rests. The sample 10 is carried by the holder 58. A feedback controller 57 is provided for varying the distance between the tip 12 and the sample 10. A voltage controller 59 is provided for controlling the bias voltage at the tip 10. In this embodiment, the voltage controller 59 is a controller known as a TOPSystem II Advanced SPM Controller sold by WA Technology Ltd, but other commercially available voltage controllers can be employed.

The inner scanning piezo-electric tube 46 has four electrodes on its outer peripheral surface and one grounded electrode on its inner peripheral surface. This arrangement enables the three-dimensional motion of the tip 12 to be controlled. The tip holder 44 is mounted along the central axis to minimise any lateral thermal drifts. Lateral translation along the surface of the sample 10 is achieved by biasing opposite electrodes with an identical voltage but of opposite sign, thus permitting a wider scan range to be obtained with low voltage and therefore minimising the piezo-creeping effect. Vertical movement is achieved by application of a common bias to all four electrodes. The inside electrode is always grounded and therefore shields cabling (not shown) leading to the tip 12 from potentials applied to the outer electrodes.

The outer piezo-electric tube 52 is provided with a single electrode on its inner peripheral surface and a grounded electrode on its outer peripheral surface. The high voltages applied to these electrodes are confined between the outer electrode of the outer tube 52 and the inner electrode of the inner tube 46 which are both held at ground potential. This eliminates any stray fields surrounding the tube 46 and protects the tip connection from external electrical noise. The relatively long quartz rods 56 reduce the resonant frequency of the STM to 21 kHz. The operation of the STM is unaffected by an ambient noise level even as high as 75 dB.

Ramp voltages applied to the outer piezo-electric tube 52 provide a coarse approach of the sample 10 towards the tip 12. Rates and voltages applied are appropriately low to provide a step size as low as 0.5 nm. No gears or mechanical components are needed and therefore thermal drift and mechanical vibrations are kept to a minimum.

Referring now to FIG. 5, the handling system for handling samples 10 and tips 12 is shown schematically. The handling system includes a carrier 60 mounted on the inner end of the transfer arm 36. In use, the carrier 60 can be withdrawn from the instrument to have sample 10 together with holder 58, as well as a number of tips 12 complete with carriers 40, removably mounted thereon. In FIG. 5 only one tip 12 with carrier 40 is illustrated. The carrier 60 with sample 10 and tip or tips 12 mounted thereon can then be introduced into the main chamber 20 through the load-lock chamber 22 and the gate valve 26 to a position in which they are accessible to a manipulator indicated generally by arrow 62. The manipulator 62 comprises a support 64 which can be manipulated externally by an operator so as to be movable axially longitudinally, laterally and rotatably as indicated by the arrows in FIG. 5. The support 64 carries a copper block 66. A screw threaded rod 68 is provided upon which is mounted an element 70 carrying a ceramic holder 72.

The rod 68 also carries a tip support assembly 74 including a tip fork 76. The tip fork 76 can be manipulated into a position in which it can be used to transfer a tip 12 from the carrier 60 to a tip storage magazine 78 capable of carrying a plurality of tips 12 and which is laterally movable to facilitate mounting and demounting of tips 12. The tip fork 76 can also be used to transfer one of the tips 12 from the magazine 78 into the tip holder 44 in the STM.

Referring back to FIG. 4, the insertion of the spigot 42 into the tip holder 44 is facilitated by the coarse sample approach mechanism. The spigot 42 can only be pushed into the tip holder 44 partway before the resultant frictional force is greater than the force necessary to push the entire suspended STM. The spigot is pushed into the correct position within the holder 44 by applying a small force to the tip 12 by means of the fork 76 whilst simultaneously using the coarse approach. The high frequency shaking caused by the approach mechanism allows the tip 12 to be fully inserted. The same technique is used when removing the spigot 42 from the tip holder 44.

The manipulator 62 can also be used to remove the sample 10 complete with holder 58 from the carrier 60. This is done by separating the copper block 66 from the element 70 by appropriate translation of the screw threaded rod 68. This allows the manipulator 62 to be operated so that the ceramic holder 72 is introduced into the sample holder 58 and then the screw-threaded rod 68 appropriately translated to clamp the sample holder 58 against the copper block 66. At this stage, the sample 10 can then be subjected to a heat treatment operation in order to clean it. This is shown in more detail in FIG. 6 to which reference is now drawn.

In FIG. 6, the sample 10 which may, for example, be a silicon [111] wafer segment is heated by electron bombardment from a tungsten filament 80 mounted within the ceramic holder 72 when the latter has been inserted into a recess 58a in the sample holder 58. The copper block 66 is attached directly to a cold finger for good thermal conduction. When the sample holder 58 is in contact with the copper block 66, it can be cooled with liquid nitrogen whilst the surface of the sample 10 is heated, hence reducing contamination of the chamber 20 by out-gassing from the holder 58. Heating of the sample 10 by electron bombardment can be obtained by passing a current of approximately 3 amps through the tungsten filament 80 until it emits electrons whilst the sample 10 is biased at 900 volts positive voltage. Electrons are accelerated towards the back of the sample 10 providing enough heat to reach 1250° C., suitable to clean silicon for example. The temperature can be measured by a pyrometer (not shown) which monitors infrared emission from the front of the sample 10. After the sample has been cleaned, it can then be mounted into the position illustrated in FIG. 4 within the STM by the manipulator 62.

Referring now to FIG. 7, there is illustrated an alternative arrangement for resistive heating of the sample 10. In this embodiment, an electrical connecting wire 82 is provided for resistive heating as an alternative to electron bombardment by filament 80. This wire 82 passes current into the sample holder 58. In this embodiment, resistive heating takes place via molybdenum clips 84 holding the sample 10, with a return path for the resistive heating taking place via the cooled copper block 66.

Referring now to FIG. 8, the construction of one possible example of the tip 12 is shown. The tip 12 terminates in a very sharp apex 12a. A grounded cylindrical sheath 90 surrounds the tip 12 coaxially and is set back from the apex 12a by a distance ($d_{tip}$) of about 200 nm from the apex 12a. The grounded sheath 90 is spaced therefrom by an electrical insulator 92 and serves as a shield to reduce the inhomogeneous field created by the tip in use, and allows electrons to escape with a single bounce.

In a typical example, the tip 12 is made from tungsten having a [111] orientation and is preferably formed by etching a filament of a [111]-oriented tungsten single crystal followed by thermal-field treatment by applying +2000 volts to the tip 12 whilst heating to 1000° C. in vacuum.

Referring now to FIG. 9, the electron analyser 100 illustrated schematically therein is a hemispherical analyser capable of measuring electron energy loss, thereby to enable the chemical identity of those regions of the sample 10 from which the electrons have been reflected to be analysed. The electron analyser 100 is pivotable about an angle α relative to the electron source, where α is up to 26°. The analyser 100 comprises two metal hemispheres 102 and 104 which are, respectively, of concave and convex shape with coincident centres of curvature. Different voltages $V_{in}$ and $V_{out}$ are placed on the hemispheres 104 and 102, respectively, such that there is an electric field in the gap 106 between these two hemispheres. Electrons are injected into the gap between the hemispheres. If electrons passing into the gap 106 are travelling very fast, they will impinge against the outer hemisphere 102. If they are travelling very slowly, they will be attracted to the inner hemisphere 104. Hence only electrons in a narrow energy region (around the so-called pass energy, $E_{pass}$) will succeed in passing all the way along the gap 106 and reach a detector 108 which, in this embodiment, is a channeltron. A series of three electrostatic lenses 110, 112 and 114 and deflector plates 116 are placed upstream of the hemispheres 102 and 104 relative to the flow direction of the electrons passing through the analyser from the entrance aperture 14. By applying appropriate voltages to these lenses 110 and deflector plates 116, electrons are focussed and enter a narrow entrance aperture 118 of the hemispheres 102 and 104.

The use of three lenses 110, 112 and 114 is considered to be sufficient focussing for incident electron energies of 200 eV.

As an example, the first lens 110 is at ground potential (zero volts), the second lens 112 is at 117 Volts, whilst the third lens 114 is a lens at the pass voltage of 100 Volts.

In use, the instrument is operable in two modes with the sample 10 remaining in situ in the main chamber 20.

In the first mode, the tip 10 is operated using the voltage controller 59 (FIG. 4) in scanning tunnelling mode in a manner known per se whilst the tip 12 is traversed in two dimensions over the surface of the sample. This involves varying the distance between the tip 12 and the sample 10 by means of the feedback controller 57 (FIG. 4) which uses a feedback loop to maintain a constant tunnelling current, and monitoring the variations in voltage to give an indication of the topography of the surface of the sample 10 in a manner known per se. During this mode, the voltage is relatively low (in the range of about −5 to +5 volts, more usually −2 to +2 volts) and is insufficient to cause the tip 12 to operate in electron emitting mode.

In the second mode the tip 12 is operated using the voltage controller 59 at a higher bias voltage to cause electron emission and back-scattering of the emitted electrons takes place and these are analysed in the analyser as described above to indicate non-destructively the chemical nature of that point on the sample where electron reflection has taken place.

Figure 10:
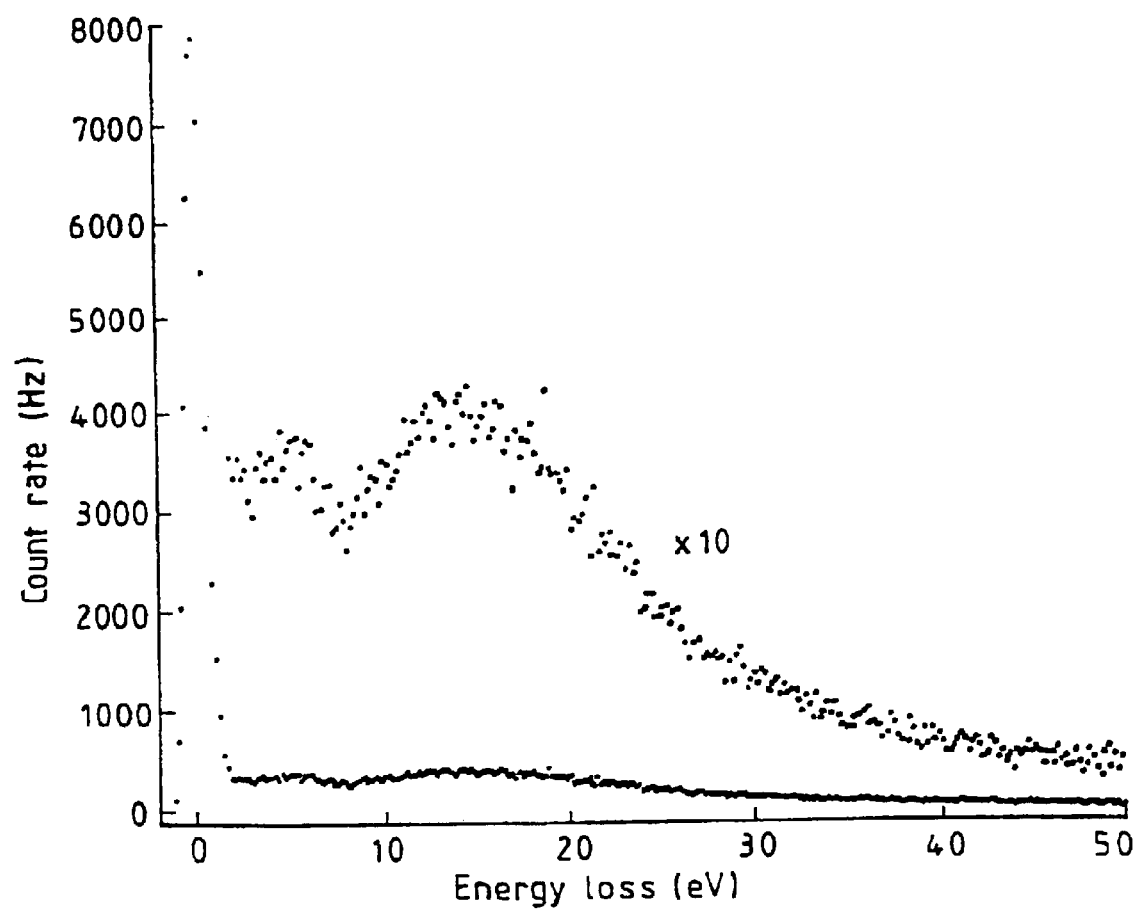

FIGS. 10 to 12 show spectra obtained on various samples using an instrument according to the present invention.

In FIG. 10, the spectrum was obtained on gold surface with an incident beam energy of 182 eV.

In FIG. 11, the spectrum was obtained on a Si(111) sample with an incident beam energy of 100 eV. Clearly identified are the elastic peak, the surface and bulk plasmons of the silicon, and the bulk plasmon of SiC at energies of 0, 12.0, 17.5 and 20.8 eV. respectively.

In FIG. 12, the spectrum was obtained on highly oriented pyrolytic graphite (HOPG) at an incident beam energy of 120 eV. The elastic peak is shown at 0 eV, whilst the loss at 7.4 eV corresponds to the graphite surface plasmon peak.

Thus, the instrument can be operated at low voltage in scanning tunnelling mode to identify a feature of interest and then the chemical nature of this feature can be analysed by operating the tip 12 in the second mode without moving the tip 12 over the surface of the sample 10. Alternatively, the instrument can be scanned two dimensionally over the sample 10 whilst operating the tip 12 in the second mode to produce a chemical map of the surface of the sample 10. All this can be done with the sample remaining in situ within the instrument.

Referring now to FIG. 13, the alternative tip assembly illustrated therein has a grounded cylindrical enclosure 140 which surrounds the tip 12 and which extends towards the sample 10 so as to produce a field free zone between the surface of the sample 10 and the enclosure 140.

In this embodiment focussing of the field emitted electron beam is via an intermediate gate electrode 142 and an exit gate electrode 146. A dielectric 143 separates the tip 12 and the gate electrode 142 and also the gate electrodes 142 and 146 as shown. Fabrication can be carried out as described by Driskell-Smith et al (A. A. G. Driskell-Smith, D. G. Hasko and H. Ahmed, Applied Physics Letters, Vol 75, No 18 (1999)), wherein the STM tip 12 and the electrodes 142 and 146 are made of tungsten, and the dielectric 143 is of $SiO_2$. The vertical and internal horizontal dimensions are less than 1000 nm with a beam exit aperture of preferably less than 50 nm. The small size has the desired effect of reducing aberrations, as these scale with dimension. With this design, the field emitting turn-on voltage can be less than 10 Volts and is independent of ambient temperature. A predicted emission stability better than 5% is expected at room temperature, improving considerably at low temperature.

This embodiment is not limited in the number of control gate electrodes for beam focussing.

Referring now to FIG. 14, the tip assembly of FIG. 13 can be provided with a cylindrical mirror analyser (CMA) positioned between the exit gate electrode 146 and the surface of the sample 10. By applying different voltages to concentric cylinders 147 and 148 of the CMA, electrons can be selected with a narrow energy range, suitable for vibrational spectral analysis. The expected energy resolution will be less than one tenth of an electron volt and preferably millielectron volts. The grounded enclosure 140 extends over the CMA to ensure a field free zone between the sample 10 and enclosure 140. The CMA acts as an electron monochromator with exit aperture 152 of the enclosure 140 being made as small as possible, preferably less than 10 nm. In the present embodiment the beam is focussed onto the sample surface, however, further focussing electrodes can be provided to reduce the beam spot size on the sample surface to increase lateral resolution. The whole assembly is less than 100 micrometers in height.

What is claimed is:

1. A spectrometer comprising:
   (i) an electron emitter tip;
   (ii) a sample carrier adapted to carry a sample so that a surface thereof to be analyzed is presented towards the tip;
   (iii) means for effecting relative movement between the sample carrier and the tip so as to enable the distance between the tip and the surface of the sample to be varied in use and so as to enable the sample surface to be scanned in two dimensions by the tip; and
   (iv) an electron analyzer positioned to analyze electrons emitted from the tip and which have been back-scattered off the sample surface in use whereby to perform spectroscopic analysis of the sample;
   characterised in that the electron analyzer is positioned so as to detect back-scattered electrons travelling at an angle of less than 20° with respect to the sample surface.

2. A spectrometer as claimed in claim 1, wherein the electron analyzer is positioned so as to detect back-scattered electrons travelling at an angle of not more than 15° with respect to the sample surface.

3. A spectrometer as claimed in claim 1, wherein the tip has a radius which does not exceed 30 nm.

4. A spectrometer as claimed in claim 1, wherein means are provided for adjusting the angle of the analyzer with respect to the surface of the sample being analyzed.

5. A spectrometer as claimed in claim 1, wherein the tip is formed of tungsten.

6. A spectrometer as claimed in claim 5, wherein the tungsten has an orientation.

7. A spectrometer as claimed in claim 1, wherein the tip is shielded with a coaxial cylindrical sheath which is grounded.

8. A spectrometer as claimed in claim 7, wherein the sheath terminates about 200 nm from the apex of the tip.

9. A spectrometer as claimed in claim 1, wherein a grounded enclosure with an aperture facing towards the surface of the sample is provided around the tip so as to project forwardly of the tip towards the location at which the sample surface is disposed in use.

10. A spectrometer as claimed in claim 9, wherein focussing means are provided in the enclosure for focussing the electron beam between the tip and the surface of the sample.

11. A spectrometer as claimed in claim 9, wherein an energy dispersive electron optical system is provided for selecting electrons with a predetermined energy range.

12. A method of spectroscopically analyzing the surface of a sample, comprising the steps of:
   (i) effecting relative movement between an electron emitter tip and the surface of the sample so as to scan the surface in two dimensions;
   (ii) causing electronics emitted from the tip to impinge against the surface and be back-scattered thereby; and
   (iii) analyzing the back-scattered electrons; wherein the back-scattered electrons which are travelling at an angle of less than 20° with respect to the sample surface are analyzed.

13. A method as claimed in claim 12, wherein the electrons are caused to be emitted with a beam energy of between about 10 and 200 eV in step (ii).

14. A method as claimed in claim 12, wherein, in step (ii), the distance between the tip and the sample is less than 200 nm.

15. A combined surface topography and spectroscopic analysis instrument comprising:
   (i) a scanning tunnelling microscope tip;
   (ii) a sample carrier adapted to carry a sample so that a surface thereof to be analysed is presented towards the tip;
   (iii) means for effecting relative movement between the carrier and the tip so as to enable the distance between the tip and the surface to be varied in use and so as to enable the sample surface to be scanned in two dimensions by the tip; and (iv) an electron analyzer positioned to detect electrons from the tip which have been back-scattered off the sample surface in use;

characterised in that voltage control means are provided for selectively operating the tip in a first voltage range in scanning tunnelling mode, to enable spatial resolution imaging of the sample surface, and for selectively operating the tip in a second voltage range higher than the first, so that the tip -is operated in electron field emission mode whereby to permit the electron analyzer to analyze the back-scattered electrons;

wherein the electron analyzer is positioned so as to detect back-scattered electrons travelling at an angle of less than 20° with respect to the sample surface when the tip is operated in field emission mode.

16. A method of effecting combined surface topographic and spectroscopic analysis of a sample comprising the steps of:

(i) effecting relative movement between a surface of a sample and a scanning tunnelling microscope tip;

(ii) selectively operating the tip in a first voltage range, in scanning tunnelling mode, to enable spatial resolution imaging of the sample surface;

(iii) selectively operating the tip in a second voltage range higher than the first voltage range, so that the tip is operated in electron field emission mode; and (iv) analyzing back-scattered electrons so as perform spectroscopic analysis of the sample surface when the tip is operated in field emission mode;

wherein, when the tip is operated in field emission mode, the back-scattered electrons which are travelling at an angle of less than 200 with respect to the sample surface are analyzed.

17. A spectrometer comprising:

(i) an electron emitter tip which in use is operated to cause electrons to be emitted with a beam energy of between 10 and 200 eV;

(ii) a sample carrier adapted to carry a sample so that a surface thereof to be analyzed is presented towards the tip;

(iii) means for effecting relative movement between the sample carrier and the tip so as to enable the distance between the tip and the surface of the sample to be varied in use and so as to enable the sample surface to be scanned in two dimensions by the tip; and (iv) an electron analyzer positioned to analyze electrons emitted from the tip and which have been back-scattered off the sample surface in use whereby to perform spectroscopic analysis of the sample;

characterised in that the electron analyzer is positioned so as to detect back-scattered electrons travelling at an angle of less than 20° with respect to the sample surface.

* * * * *